Patented Mar. 2, 1943

2,312,504

UNITED STATES PATENT OFFICE 2,312,504

NAPHTHOQUINONE OXIDES

Max Tishler, Rahway, N. J., assignor to Research Corporation, New York, N. Y., a corporation of New York No Drawing. Original application July 23, 1940, Serial No. 347,042. Divided and this application May 8, 1942, Serial No. 442,243

3 Claims. (Cl. 260—348)

This invention relates to 2-alkyl-3-alkenyl-1,4-naphthoquinone-2,3-oxides of the group consisting of 2-methyl-3-phytyl-1,4-naphthoquinone-2,3-oxide and 2-methyl-3-cinnamyl-1,4-naphthoquinone-2,3-oxide.

Example I

Preparation of 2-methyl-3-phytyl-1,4-naphthoquinone-2,3-oxide

To a mixture of 1 gram of 2-methyl-3-phytyl-1,4-naphthoquinone in 50 cc. of ethyl alcohol kept at 70–75° C. is added 1 cc. of 30% hydrogen peroxide and then a solution of 1 gram of anhydrous sodium carbonate in 2 cc. of water. The mixture is shaken well until the mixture no longer gives a purple color reaction with sodium methylate which is characteristic of the starting material. Heating and shaking for about 3 to 5 minutes is required to reach this stage. The yellow color of the starting material fades and at the end, the mixture is somewhat pink in color. The reaction mixture is then diluted with water and extracted with ethyl ether. The ether extract, after washing well with water, is dried over magnesium sulfate, decolorized by warming with a small amount of Norite and concentrated. The pale, straw-colored residue (0.88 gram) is substantially pure 2-methyl-3-phytyl-1,4-naphthoquinone-2,3-oxide.

Analysis:
Calculated for $C_{31}H_{46}O_3$—
  Carbon_____ 79.77
  Hydrogen_____ 9.94
Found—
  Carbon_____ 79.85
  Hydrogen_____ 9.69

The product does not respond to the Dam-Karrer test for vitamin $K_1$ but on warming with alcoholic alkali, it gives a pink-red coloration. The product has a characteristic ultraviolet absorption, having a maximum between 2550 and 2650 Angstrom units. ($E_M$=6000). The product has anti-hemorrhagic activity comparable with that of 2-methyl-3-phytyl-1,4-naphthoquinone and is much less sensitive to light than the latter substance.

Example II

Preparation of 2-methyl-3-cinnamyl-1,4-naphthoquinone-2,3-oxide 0.9 gm. of 2-methyl-3-cinnamyl-1,4-naphthoquinone dissolved in 50 cc. of ethyl alcohol is heated to boiling. To this solution are added 1 cc. of superoxol (30% hydrogen peroxide) and 1 gm. of sodium carbonate dissolved in 2 cc. of water. The solution became brownish and then turned to red-orange. It gave no Dam-Karrer test after 3 minutes. The product was worked up as in Example I.

2-methyl-3-cinnamyl-1,4-naphthoquinone-2,3-oxide crystallizes from ether-petroleum ether mixture in white needles, M. P. 85–86°.

Analysis:
Calculated for $C_{20}H_{16}O_3$—
  Carbon_____ 78.94
  Hydrogen_____ 5.26
Found—
  Carbon_____ 78.94
  Hydrogen_____ 5.47

This application is a division of an application filed in the names of Louis F. Fieser and Max Tishler, Serial No. 347,042, filed July 23, 1940 and which has been converted to the sole application of Louis F. Fieser.

I claim:

1. A 2-alkyl-3-alkenyl-1,4-naphthoquinone-2,3-oxide of the group consisting of 2-methyl-3-phytyl-1,4-naphthoquinone-2,3 oxide and 2-methyl-3-cinnamyl-1,4-naphthoquinone-2,3 oxide.

2. 2-methyl-3-phytyl-1,4-naphthoquinone-2,3 oxide.

3. 2-methyl-3-cinnamyl-1,4-naphthoquinone-2,3 oxide.

MAX TISHLER.